May 14, 1935.  W. UYTERHOEVEN ET AL  2,001,511
GASEOUS ELECTRIC DISCHARGE LAMP DEVICE
Filed March 30, 1934
Fig. 1
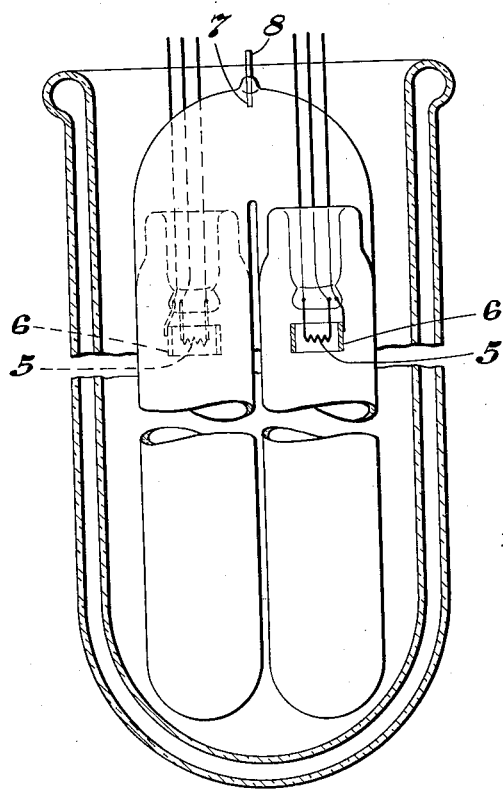
Fig. 3
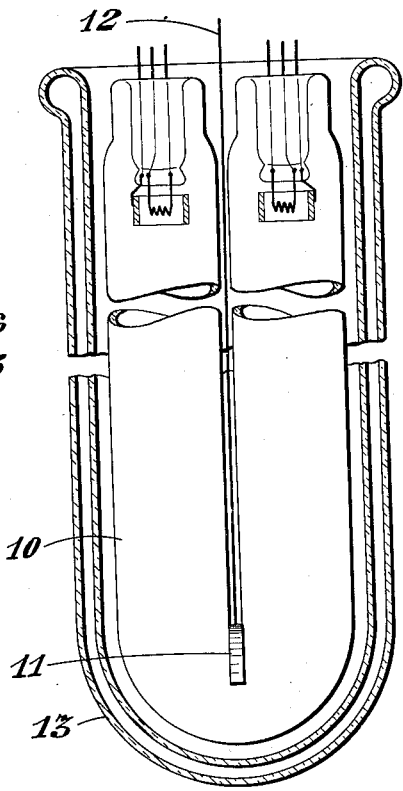
Fig. 2
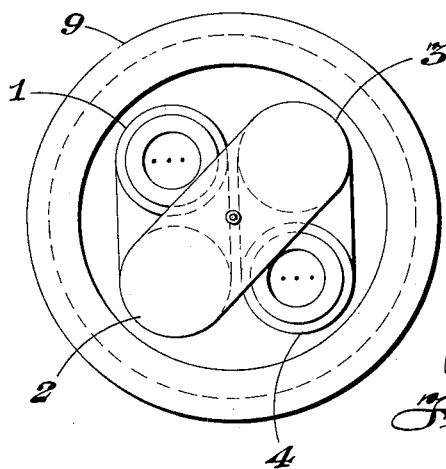
Fig. 4
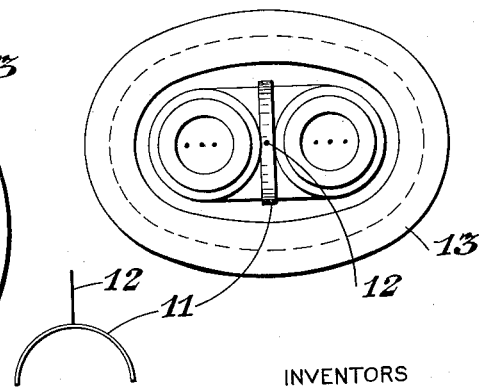
Fig. 5
INVENTORS
Willem Uyterhoeven
Mari Johan Druyvesteyn
BY Harry E. Dunham
ATTORNEY Patented May 14, 1935

2,001,511

UNITED STATES PATENT OFFICE 2,001,511

GASEOUS ELECTRIC DISCHARGE LAMP DEVICE

Willem Uyterhoeven and Mari Johan Druyvesteyn, Eindhoven, Netherlands, assignors to General Electric Company, a corporation of New York Application March 30, 1934, Serial No. 718,241 In Germany April 3, 1933

4 Claims. (Cl. 176—122)

The present invention relates to gaseous electric discharge lamp devices generally and more particularly the invention relates to such devices the gaseous atmosphere of which consists of, or comprises a metal vapor.

The efficiency of an electric discharge lamp device having a gaseous filling consisting of or comprising the vapor of a difficultly vaporizable material, such as sodium, potassium, rubidium, cadmium, magnesium, thallium, or zinc, is increased by mounting said device in a heat conservator, such as a double-walled jacket having the space between the walls evacuated. The heat conservator reduces the radiation of heat from the container of the electric discharge device so that said container is at an elevated temperature and the metal vapor therein is at an effective pressure during the operation of the device which has a beneficial effect on the efficiency of the discharge device. The air in the space between container of the device and the heat conservator tends to equalize the temperature of the various parts of the container of the device so that different temperatures at different parts of the container are avoided which is likewise beneficial to the efficiency and useful operating life of the device. The space between the walls of the heat conservator is not necessarily highly evacuated; even when this space contains air or some other gas at a low pressure the radiation of heat from the container of the device is reduced beneficially.

The object of the present invention is to reduce the radiation of heat from the container of a gaseous electric discharge lamp device to a minimum. Another object of the invention is to provide a compact, efficient lamp unit emitting high intensity light and which is operable on 110 or 220 volt alternating current sources. Still further objects and advantages attaching to the device and to its use and operation will be apparent to those skilled in the art from the following particular description.

According to the invention, the discharge tube which has an elongated shape and a positive-column discharge, is bent in such a way that the surface which emits heat, is smaller than in the case of a straight shape of the tube. If the manner is considered in which the heat of the discharge tube is given off to the surroundings, then it is found that this heat is, in the first place, transmitted to the internal wall of the double-walled cover, that is the heat conservator, by means of radiation, conduction and convection. From there on, the heat is transmitted to the external wall of the cover and to the surroundings by means of radiation. If the discharge tube is now folded up in such a way that the internal wall of the cover which emits the heat is smaller than in the case of a straight tube, then the heat emission of the tube is greatly reduced, so that the amount of energy which is consumed by the tube for the purpose of holding the required temperature, is decreased. By comparing, for instance, two tubes of equal length, one of which is arranged in the straight shape within a cover while the other is first bent into four parallel pieces and then arranged within a cover, it will be evident that the heat-emitting surface in the second case, is considerably less than would be the case when the straight tube is utilized, because of the fact that the length of the cover in the second case is only approximately one-quarter of the length of the cover in the first case. It is also evident, that it is not only necessary to bend the discharge-tube into two or several parts, but that this bending must be performed in a special manner. If the tube were to be bent in such a way that the different parts were to be located at a great distance from each other, then it would be possible that the heat-emitting surface would be increased, notwithstanding the reduction in the length of the cover, because of the great enlargement of the diameter of the cover. The different parts of the bent tube must therefore, lie close enough together. Furthermore, the distance from the tube to the cover must be sufficiently small, as too great a distance would cause too great an enlargement of the diameter of the cover and consequently, of the heat-emitting surface.

These conditions, which must be satisfied by the discharge tube and the cover, can be readily defined if the concept "utilization factor" is introduced. For this purpose, a cross-section is assumed through the tube and the cover, perpendicular to the axis of the tube. In the cross-section it is now possible to determine the area limited by the internal wall of the cover, and the total area of the cross-section of the various parts of the tube can also be determined. The utilization factor is now meant as the ratio between this total area of the cross-sections of the tube, and the area limited by the inside wall of the cover.

The above indicated conditions, namely, that the parts of the tube must lie sufficiently close together and that the distance between the cover and the discharge tube must be sufficiently small, may be expressed by stating that the utilization factor must have a sufficiently high value. By means of tests and by means of calculation, it was found that in order to obtain a considerable decrease in the heat-emission, this utilization factor must be larger than $$\frac{1}{n}$$

where "$n$" is the number of folds of the discharge tube by parts.

The above consideration also holds true when the vacuum space which surrounds the discharge tube is not formed by a detached double-walled cover but by a single-walled cover which surrounds the discharge tube and in which the space between the discharge tube and this cover is evacuated. The heat emitted by the discharge tube to the surroundings, takes place in this case mainly by heat radiation from the wall of the discharge tube to the cover. In a straight tube, the entire wall of the tube radiates heat while in the case of the bent tube, the radiating surface may be said to be practically equal to the smallest imaginary surface which surrounds the bent tube. This surface may therefore, be said to be equal to the inner wall of the above described double-walled cover. This surrounding surface, must therefore, also be taken into account in the determination of the utilization factor.

A practical and simple physical embodiment is obtained if the discharge tube is made of three or more parallel parts. The cover can, in that case, be given a circular cross-section. If the discharge-tube is made up of two parts, then it is necessary to give the cross-section of the cover a flat shape, such as an elliptical shape, in order to obtain a sufficiently large utilization factor. In order to increase the utilization factor, it may be to advantage to give the cross-section of the tube a shape which differs from a circle in order to place, in that manner, the different parts of the discharge tube together with small intermediate spaces.

In some cases, the ignition-voltage of the discharge tubes is increased somewhat as a result of the bending. This disadvantage can be eliminated if necessary, by providing the tube and preferably the curved parts, with one or more auxiliary electrodes. These auxiliary electrodes, can, under certain circumstances, be arranged on the outside of the wall of the tube. It is also possible to resolve the tube into two or more parts. For instance, a tube consisting of four parallel parts can be made up of two individual U shaped tubes; in this case there is the possibility of providing the parts of the tube with different fillings; in this manner, the emitted light can be made to consist of a mixture of light rays of different colors.

The invention is particularly important in discharge tubes that are operated with alternating-current, because in these tubes an ignition of the discharge takes place once or twice per alternating-current cycle. It was found that at every ignition, the discharge, accompanied by light emission, starts at the cathode and is propagated through the tube until it reaches the anode. If the tube is designed in such a way that in each A. C. ½ cycle the current can flow through the tube, then the discharge is interrupted for a brief period twice per cycle and no light is emitted during the interruption. It is of major importance to make the time during which the tube does not emit any light, as brief as possible, so that the emitted light will flicker less. For this purpose, it is important that at each ignition, the discharge is propagated from the cathode to the anode with the highest possible speed. When the discharge advances, the resonance rays which are emitted by that part of the tube in which the discharge already takes place, can excite the molecules in the other part of the tube. Let us take for instance, a straight and horizontally arranged tube in which the discharge advances from the left to the right and in which the discharge has already reached the center of the tube. The rays emitted by the left part favor the excitation of the molecules in the right half. However, it is evident that in such a straight tube, only a small part of the rays that are produced in that part of the tube in which the discharge already takes place, can strike the remaining part of the tube. This striking possibility is considerably greater if the tubes are bent according to the invention, as in this case, the rays produced in one part of the tube can act to a much greater extent, on another part of the tube, which runs parallel to the first. For that reason, the time during which the tube does not emit any light between two cycles, is abbreviated, whereby the flickering is reduced.

The discharge tube, according to the invention, offers the further advantage of having a very compressed shape which affords the possibility of arranging the tubes in fittings of ordinary shape and dimensions. Notwithstanding the compressed shape, the discharge path can be made very long, so that the operating voltage can be adapted as closely as possible to the network voltage by lengthening the discharge path; thereby, it becomes possible to use a small series impedance which in turn can cause an improvement in the power factor.

In the drawing accompanying and forming part of this specification two embodiments of the invention are illustrated, in which Fig. 1 is a side elevation partly sectional view of one embodiment of the invention, Fig. 2 is a top view of the embodiment of the invention illustrated in Fig. 1, Fig. 3 is a front elevational view, partly sectional view of another embodiment of the invention, Fig. 4 is a top view of the invention illustrated in Fig. 3 of the invention, and Fig. 5 is a detail view of one of the elements of the device illustrated in Figs. 3 and 4.

Like numbers denote like parts in all the figures.

Referring to Figs. 1 and 2 the new and novel lamp unit comprises a gaseous electric discharge lamp device 1, 2, 3, 4 and a heat conservator 9 therefor. Said lamp device comprises a curved container having four straight parallel legs 1, 2, 3 and 4 connected by three curved parts. A pair of electrodes 5 and 6 are sealed into the closed ends of each of said legs 1 and 4 as shown schematically in the drawing. Said electrodes 5 are electron emitting when heated and consist of a filament of high melting point material, such as tungsten, coated, or impregnated with an electron emitting material, such as barium oxide. Said electrodes 6 are open-ended cylindrical anodes mounted around said cathodes 5. The current supply lead of each of said anodes 6 is connected to one of the two current supply leads of the particular cathode 5 which said anode 6 surrounds. An auxiliary electrode 7 having a current lead 8 is sealed in the central curved position of the container. Said auxiliary electrode 7 facilitates the starting of the main discharge between the pairs of electrodes 5 and 6. The container of the lamp device has a gaseous atmosphere therein comprising a rare, starting gas such as neon and the vapor of a difficultly vaporizable material, such as sodium. The container consists of, or comprises a glass resistant to the effects of the metal vapor, of course. The lamp device is mounted in a double-walled heat conservator 9. The space between the walls of said conservator 9 is evacuated.

The parallel legs 1, 2, 3 and 4 of the lamp container are closely adjacent. Said legs 1, 2, 3 and 4 are separated at least two millimeters and the outside diameter of said legs 1, 2, 3 and 4 is approximately 22 millimeters. The distance between the inside wall of the conservator 9 and the lamp container is at least 2 millimeters. The utilization factor of a lamp unit of this type and in which the above dimensions are observed is approximately 0.5. The utilization factor is determined by comparing the total area limited by the external wall of the tube parts 1, 2, 3 and 4 in a plane at right angles to the axis of each of said tube parts 1, 2, 3 and 4 with the area limited by the internal wall of the conservator 9 in said plane. The ratio between the area limited by the tube parts 1, 2, 3 and 4 and the area limited by the internal wall of the conservator 9 in said plane gives the utilization factor of the lamp unit. The heat emission of the curved lamp container is thus considerably less than that of a straight tube having the same dimensions and is less sensitive to ambient temperature changes. The lamp device is a concentrated light source due to the compact shape thereof.

The embodiment of the invention illustrated in Figs. 3, 4 and 5 is similar in all respects to that illustrated in Figs. 1 and 2 except that in this embodiment the lamp container 10 is of U-shape and the auxiliary starting electrode is a metal band applied to the outside of the bend in the container 10 and has a current lead 12, and the heat-conservator 13 is elliptical in shape in cross-section (Fig. 4). The outside diameter of each of the parallel legs of said container 10 is approximately 22 millimeters and the distance between the legs is approximately 2 millimeters. The axes of the elliptical inside wall of the heat conservator 13 are 52 millimeters and 31 millimeters in length respectively. The utilization factor in this embodiment is approximately 0.6 and is determined by the method disclosed in connection with Fig. 1.

It will be understood of course that both embodiments of the invention are provided with a base which separately supports both the heat conservator and the container of the lamp device. The space between the conservator and the lamp device is closed off from the outside atmosphere by insulation material, such as asbestos. These elements have been omitted from the drawing for purposes of simplicity of illustration.

While we have shown and described and have pointed out in the annexed claims certain novel features of the invention, it will be understood that various omission, substitutions and changes in the forms and details of the device illustrated and in its use and operation may be made by those skilled in the art without departing from the broad spirit and scope of the invention.

What we claim as new and desire to secure by Letters Patent of the United States is:—

1. A lamp unit comprising in combination, a heat conservator, a gaseous electric discharge lamp device mounted in said conservator, said lamp device comprising an elongated, tubular container having parallel parts, electrodes sealed therein and a gaseous atmosphere therein comprising the vapor of a difficultly vaporizable material, the distance between the parallel parts of the container and the distance between the container and said conservator being such that the utilization factor is greater than $$\frac{1}{n}$$

where $n$ represents the number of parallel parts.

2. A lamp unit comprising in combination, a heat conservator, a gaseous electric discharge lamp device mounted in said conservator, said lamp device comprising an elongated, tubular container having at least three parallel parts, electrodes sealed therein and a gaseous atmosphere therein comprising the vapor of a difficultly vaporizable material, the distance between the parallel parts of the container and the distance between the container and said conservator being such that the utilization factor is greater than $$\frac{1}{n}$$

where $n$ represents the number of parallel parts.

3. A lamp unit comprising in combination, a heat conservator elliptical in cross-section, a gaseous electric discharge lamp device comprising a U-shape, elongated tubular container, electrodes sealed therein, a gaseous atmosphere therein comprising the vapor of a difficultly vaporizable material, the distance between the parallel parts of the container and the distance between the container and the heat conservator being such that the utilization factor is 0.6.

4. A lamp unit comprising in combination, a heat conservator, a gaseous electric discharge lamp device mounted in said conservator, said lamp device comprising an elongated, tubular container having parallel parts, electrodes sealed therein and a gaseous atmosphere therein comprising the vapor of a difficultly vaporizable material, the distance between the parallel parts of the container and the distance between the container and said conservator being such that the utilization factor is greater than $$\frac{1}{n}$$

where $n$ represents the number of parallel parts, one of said electrodes being an auxiliary, starting electrode mounted on an intermediate, curved part of said container.

WILLEM UYTERHOEVEN.
MARI JOHAN DRUYVESTEYN.